(12) United States Patent
Adachi et al.

(10) Patent No.: US 10,994,768 B2
(45) Date of Patent: May 4, 2021

(54) CONTROL DEVICE FOR VEHICLE

(71) Applicant: Honda Motor Co., Ltd., Tokyo (JP)

(72) Inventors: Takashi Adachi, Saitama (JP);
Masayuki Sadakiyo, Saitama (JP);
Tomoyuki Noguchi, Saitama (JP);
Hisashi Ishikawa, Saitama (JP);
Kentaro Arai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 268 days.

(21) Appl. No.: 16/390,027

(22) Filed: Apr. 22, 2019

(65) Prior Publication Data

US 2019/0322308 A1 Oct. 24, 2019

(30) Foreign Application Priority Data

Apr. 23, 2018 (JP) .............................. JP2018-082495

(51) Int. Cl.
*B62D 1/28* (2006.01)
*B60T 8/1755* (2006.01)
*B60T 8/74* (2006.01)
*G05D 1/02* (2020.01)
*B62D 6/00* (2006.01)

(52) U.S. Cl.
CPC .............. *B62D 1/28* (2013.01); *B60T 8/1755* (2013.01); *B60T 8/74* (2013.01); *G05D 1/0212* (2013.01); *B60W 2720/106* (2013.01); *B60W 2720/14* (2013.01); *B62D 6/002* (2013.01); *G05D 2201/0213* (2013.01)

(58) Field of Classification Search
CPC .... B60T 8/1755; B60T 8/74; B60T 2270/406; B62D 6/002; B60W 2510/184; B60W 10/10; B60W 10/18; B60W 30/18
See application file for complete search history.

(56) References Cited

U.S. PATENT DOCUMENTS 9,751,534 B2 * 9/2017 Fung ...................... G16H 50/20
2012/0212353 A1 * 8/2012 Fung .................... B60W 30/08
340/905

(Continued)

FOREIGN PATENT DOCUMENTS

JP 2007216839 8/2007
JP 2017168741 9/2017

*Primary Examiner* — Mussa A Shaawat
(74) *Attorney, Agent, or Firm* — JCIPRNET

(57) ABSTRACT

A control device for a vehicle capable of operating in an automated driving mode for automatically controlling at least the accelerating/decelerating control of the steering control and the accelerating/decelerating control of a vehicle includes: a route information acquisition unit; and an automated driving control unit that decides an action plan on a basis of map information, the action plan includes a target vehicle speed sequence that defines a target vehicle speed at the respective predetermined points at least on a road along which the vehicle will travel next, and the automated driving control unit calculates requested braking force that is braking force for decelerating the vehicle to target vehicle speed when the target vehicle speed is achieved by deceleration, calculates a predicted temperature of a brake device when the requested braking force is achieved, and decides a utilization proportion of the brake device for the requested braking force.

17 Claims, 6 Drawing Sheets

(56) References Cited

U.S. PATENT DOCUMENTS

| | | | |
|---|---|---|---|
| 2013/0038735 A1* | 2/2013 | Nishiguchi | H04N 7/18 |
| | | | 348/148 |
| 2014/0148988 A1* | 5/2014 | Lathrop | B60W 50/14 |
| | | | 701/23 |
| 2016/0068103 A1* | 3/2016 | McNew | B60W 30/12 |
| | | | 701/23 |
| 2019/0354114 A1* | 11/2019 | Goldman | G05D 1/0297 |
| 2020/0036948 A1* | 1/2020 | Song | B60W 10/04 |
| 2020/0271470 A1* | 8/2020 | Symanow | G01C 21/3691 |

* cited by examiner

CONTROL DEVICE FOR VEHICLE

CROSS-REFERENCE TO RELATED APPLICATION

This application claims the priority benefit of Japan application serial no. 2018-082495, filed on Apr. 23, 2018. The entirety of the above-mentioned patent application is hereby incorporated by reference herein and made a part of this specification.

BACKGROUND

Technical Field

The disclosure relates to a control device for a vehicle and particularly to a control device for a vehicle that performs automated driving control for automatically controlling at least one of accelerating/decelerating and steering of a host vehicle.

Description of Related Art

Development of a vehicle provided with a function of performing automated driving control for automatically controlling at least one of accelerating/decelerating and steering of the host vehicle has advanced. Since an occupant himself/herself does not drive the vehicle under such automated driving control, there may be cases in which accelerating/decelerating that the occupant does not intend is performed. Since the occupant becomes more sensitive to vibration and noise of the vehicle due to operations of an engine and a transmission that occur with accelerating/decelerating of the vehicle at this time, yet higher vibration/noise reduction performance than that in manual driving (hereinafter, referred to as "NV reduction performance" in the specification) is required. When a vehicle is decelerated during automated driving, in particular, there is a concern that the occupant may be discomforted due to an increase in vibration and noise if control that is accompanied by application of deceleration using an engine brake and an increase in deceleration by downshifting a gear range of an automated transmission is performed. Meanwhile, if only a friction brake (wheel brake) is successively used during traveling of the vehicle, there is a concern that fading may occur due to an excessive rise of the temperature of the friction brake. Therefore, there is demand for improving the NV reduction performance while preventing fading of a friction brake and securing safety in automated driving control.

In regard to this point, Patent Document 1 discloses that an engine brake (internal combustion engine braking mechanism) and a wheel brake (mechanical braking mechanism) are selectively used in order to improve the NV reduction performance of a vehicle. Specifically, the control device and method for a vehicle disclosed in Patent Document 1 are configured such that the NV reduction performance is considered when the vehicle is decelerated and which of deceleration control using the engine brake and deceleration control of the wheel brake is to be performed is decided.

Patent Document 2 discloses that an engine brake and a wheel brake are selectively used for safety. Specifically, a driving assist device and a driving assist method disclosed in Patent Document 2 are configured such that assignment proportions of a transmission and a brake system are decided to enhance safety on the basis of host vehicle information and external environment information when the vehicle is decelerated before a bend.

Patent Documents

[Patent Document 1] Japanese Patent Laid-Open No. 2007-168741
[Patent Document 2] Japanese Patent Laid-Open No. 2007-216839

However, neither of Patent Documents 1 and 2 disclose how the engine brake and the wheel brake are to be selectively used in order to realize both NV reduction performance and safety under automated driving control. Therefore, in a case in which it is desired to decelerate the vehicle on a long downhill road, for example, along a subsequent traveling route under automated driving control, it is not possible to respond to a requirement that it is desired to decelerate the vehicle merely using the wheel brake without performing downshifting as much as possible for the NV reduction while reliably avoiding excessive heating of the wheel brake.

SUMMARY

The disclosure realizes both the NV reduction performance and the safety when the vehicle is decelerated by acquiring map information, creating an action plan for subsequent traveling, predicting the temperature of the mechanical braking mechanism, and appropriately selectively using an internal combustion engine braking mechanism and a mechanical braking mechanism on the basis of the prediction.

According to an embodiment, there is provided a control device 100 for a vehicle 1 capable of operating in an automated driving mode for automatically controlling at least the accelerating/decelerating of steering and accelerating/decelerating of a vehicle, the control device including: a route information acquisition unit 13 that is capable of acquiring a route information of a route along which the vehicle will subsequently travel on the basis of map information; and an automated driving control unit 110 that decides an action plan on the basis of the route information acquired by the route information acquisition unit 13, wherein the action plan includes a target vehicle speed sequence that defines a target vehicle speed at respective predetermined points at least on a road along which the vehicle will travel next, the vehicle is capable of performing deceleration using a power source braking mechanism that uses a braking force of a power source EG and deceleration using a mechanical braking mechanism 94 that applies a mechanical braking force to rotation of wheels as a way for decelerating the vehicle, and the automated driving control unit 110 calculates a requested braking force that is a braking force for decelerating the vehicle to a target vehicle speed in a case in which the target vehicle speed is achieved by decelerating the vehicle, calculates a predicted temperature T of the mechanical braking mechanism 94 in a case in which the requested braking force is achieved by the mechanical braking mechanism 94, and decides utilization proportions of the power source braking mechanism and the mechanical braking mechanism 94 with respect to the requested braking force on the basis of the calculated predicted temperature T of the mechanical braking mechanism 94.

According to the control device for a vehicle, the utilization proportion of the mechanical braking mechanism for the requested braking force is decided on the basis of the predicted temperature of the mechanical braking mechanism in control for achieving the requested braking force in the target vehicle speed sequence included in the action plan decided in an automated driving mode. It is possible to more reliably prevent excessive heating of the mechanical braking mechanism in a subsequent traveling route in the automated driving mode by deciding the utilization proportion of the mechanical braking mechanism on the basis of the predicted temperature. Therefore, it is possible to utilize the mechanical braking mechanism to the maximum extent and thereby to improve the NV reduction performance during deceleration of the vehicle while preventing excessive heating of the mechanical braking mechanism.

Also, in the control device 100 for the vehicle 1, a control may be performed such that in a case in which a value of the predicted temperature T of the mechanical braking mechanism 94 is less than a predetermined value T1, the utilization proportion of the mechanical braking mechanism 94 for the requested braking force is increased, as compared with a case in which the value of the predicted temperature T of the mechanical braking mechanism 94 is equal to or greater than the predetermined value T1.

With this configuration, it is possible to reduce utilization of the power source braking mechanism by more frequently using the mechanical braking mechanism in a case in which the value of the predicted temperature of the mechanical braking mechanism is low. In this manner, it is possible to avoid an increase in vibration and noise that accompany utilization of the power source braking mechanism and thereby to prevent the NV reduction performance from deteriorating.

Also, in the control device for a vehicle, a control may be performed such that in a case in which a value of the predicted temperature T of the mechanical braking mechanism 94 is equal to or greater than a predetermined value T1, the utilization proportion of the mechanical braking mechanism 94 for the requested braking force is decreased as compared with a case in which the value of the predicted temperature T of the mechanical braking mechanism 94 is less than the predetermined value T1.

With this configuration, it is possible to prevent excessive heating of the mechanical braking mechanism by reducing utilization of the mechanical braking mechanism in a case in which the predicted temperature of the mechanical braking mechanism is high.

Also, in the control device 100 for the vehicle 1, an internal combustion engine braking mechanism that causes a braking force using braking force (engine brake) that uses an internal combustion engine EG and braking force caused by change in gear ratio of a transmission mechanism TM may be included, and a control may be performed such that the requested braking force is satisfied by the internal combustion engine braking mechanism and the mechanical braking mechanism 94 without changing a gear ratio of the transmission mechanism TM in the case in which the value of the predicted temperature T of the mechanical braking mechanism 94 is less than the predetermined value T1.

With this configuration, it is possible to avoid occurrence of vibration and noise that accompany downshifting by decelerating the vehicle using the engine brake and the mechanical braking mechanism without performing downshifting using the transmission mechanism, and thereby to prevent the NV reduction performance from deteriorating.

Also, in the control device 100 for the vehicle 1, a control may be performed such that a gear ratio of the transmission mechanism is increased in the case in which the value of the predicted temperate T of the mechanical braking mechanism 94 is equal to or greater than the predetermined value T1.

With such a configuration, it is possible to obtain necessary deceleration by performing downshifting using the transmission mechanism with utilization of the engine brake and to thereby reduce the utilization of the mechanical braking mechanism. Therefore, it is possible to prevent excessive heating of the mechanical braking mechanism.

Also, in the control device 100 for the vehicle 1, the automated driving control unit 110 may calculate a temperature of the mechanical braking mechanism 94 as a temperature during traveling when the vehicle 1 is decelerated while traveling and in a case in which a calculated value of the temperature during traveling is equal to or greater than a predetermined value, the automated driving control unit may perform a control such that a gear ratio of the transmission mechanism is increased.

With this configuration, it is possible to further effectively prevent excessive heating of the mechanical braking mechanism not only by performing control based on a predicted temperature of the mechanical braking mechanism calculated in advance but also by taking the actual temperature during travel of the mechanical braking mechanism into consideration.

Also, in the control device 100 for the vehicle 1, the automated driving control unit 110 may calculate the temperature during traveling of the mechanical braking mechanism 94 on the basis of an amount of heat generated by the mechanical braking mechanism 94 during braking.

With this configuration, it is possible to more accurately calculate the temperature by taking the amount of heat generated by the mechanical braking mechanism into consideration.

Also, in the control device 100 for the vehicle 1, the action plan may include a gradient sequence of the road along which the vehicle will travel next.

With this configuration, it is possible to travel at a more appropriate vehicle speed by taking the gradient sequence of the road along which the vehicle will travel next into consideration.

Also, in the control device 100 for the vehicle 1, the action plan may include curvatures of the road along which the vehicle will travel next.

With this configuration, it is possible to travel at a more appropriate vehicle speed by taking the curvature of the road along which the vehicle will travel next into consideration.

Also, in the control device 100 for the vehicle 1, the target vehicle speed sequence of the road along which the vehicle will travel next may be calculated on the basis of the gradient sequence or the curvatures.

With this configuration, it is possible to travel at a more appropriate vehicle speed by taking the target vehicle speed sequence calculated from the gradient or the curvatures of the road along which the vehicle will travel next into consideration.

Also, in the control device 100 for the vehicle 1, the target vehicle speed sequence of the road along which the vehicle will travel next may be calculated on the basis of a road surface information.

With this configuration, it is possible to travel at a more appropriate vehicle speed by taking the road surface information into consideration.

Also, in the control device 100 for the vehicle 1, the target vehicle speed sequence of the road along which the vehicle will travel next may be calculated on the basis of a traffic jam information.

With this configuration, it is possible to travel at a more appropriate vehicle speed by taking the traffic jam information into consideration. Note that the aforementioned reference numerals in parentheses represent reference numerals of corresponding components according to embodiments, which will be described later, in the drawings.

According to the control device for a vehicle of the disclosure, it is possible to realize both the NV reduction performance and the safety when the vehicle is decelerated by acquiring map information, creating an action plan for subsequent traveling, predicting the amount of heat generated by the mechanical braking mechanism, and selectively using the internal combustion engine braking mechanism and the mechanical braking mechanism on the basis of the prediction.

DESCRIPTION OF THE EMBODIMENTS

Figure 1:
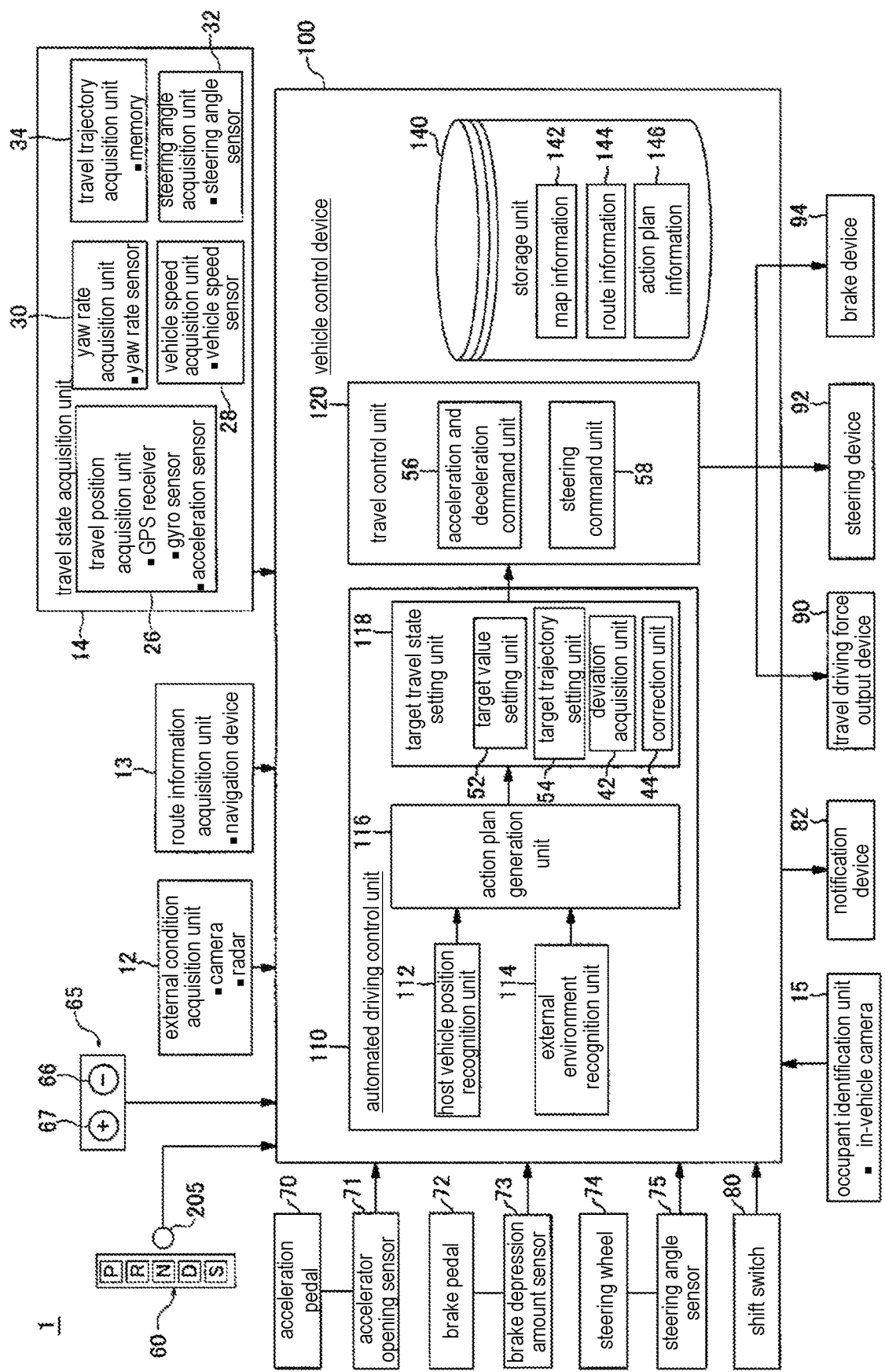
FIG. 1 is a functional configuration diagram of a control device for a vehicle according to an embodiment of the disclosure.

Hereinafter, embodiments of the disclosure will be described with reference to the accompanying drawings. FIG. 1 is a functional configuration diagram of a vehicle control device 100 mounted in a vehicle 1. A configuration of the vehicle control device 100 will be described using the drawing. The vehicle 1 (host vehicle) in which the vehicle control device 100 is mounted is, for example, a vehicle with two wheels, three wheels, four wheels, or the like and includes a vehicle using an internal combustion engine as a power source, an electric vehicle using an electric motor as a power source, a hybrid vehicle that includes both an internal combustion engine and an electric motor, and the like. Also, the aforementioned electric vehicle is driven using electric power discharged by a battery such as a secondary battery, a hydrogen fuel battery, a metal fuel battery, or an alcohol fuel battery, for example.

The vehicle 1 includes, as devices for driving or steering the vehicle 1, a travel driving force output device (driving device) 90, a steering device 92, and a brake device (hereinafter, also referred to as a "wheel brake") 94 and also includes a control device 100 that controls these components. The control device 100 includes a mechanism for taking various kinds of information from the outside of the vehicle 1, such as an outer condition acquisition unit 12, a route information acquisition unit 13, and a travel state acquisition unit 14.

In addition, the control device 100 includes operation devices such as an accelerator pedal 70, a brake pedal 72, a steering wheel (handle) 74, and a shift switch 80, operation detection sensors such as an accelerator opening sensor 71 that detects an accelerator opening in accordance with depression of the accelerator pedal 70, a brake depression amount sensor (brake switch) 73 that detects the brake depression amount in accordance with depression of the brake pedal 72, and a steering angle sensor (or a steering torque sensor) 75 in accordance with steering of the steering wheel 74, a notification device (output unit) 82, and an occupant identification unit (in-vehicle camera) 15. These devices and equipment are connected to each other via multiple communication lines such as controller area network (CAN) communication lines, serial communication lines, a wireless communication network, or the like. Note that the operation devices described as examples are only examples, and a button, a dial switch, a graphical user interface (GUI) switch, and the like may be mounted in the vehicle 1.

The outer condition acquisition unit 12 is configured to acquire outer conditions of the vehicle 1, for example, environmental information in the surroundings of the vehicle such as lanes of a traveling path and objects in the surroundings of the vehicle. The outer condition acquisition unit 12 includes various cameras (a monocular camera, a stereo camera, an infrared camera, and the like) and various radars (a millimeter wave radar, a microwave radar, a laser radar, and the like), for example. Also, it is possible to use a fusion sensor that merges information obtained by the cameras with information obtained by the radars.

The route information acquisition unit 13 includes a navigation device that acquires map information (navigation map) and derives at least a section between an automated driving start point and an end scheduled point or a section between a start point and an automated driving destination as a road along which the vehicle will travel next. Specifically, the navigation device has a map information acquisition application that acquires and updates map information as needed, a touch pane-type display device that functions as a global navigation satellite system (GNSS) receiver or a user interface, a speaker, a microphone, and the like, specifies the current position of the vehicle 1 in the acquired map information using the GNSS receiver, and derives a route from the current position to the destination designated by a user. The route derived by the navigation device is a road along which the vehicle will travel next and is stored in the route information 144 in the storage unit 140. The position of the vehicle 1 may be specified or interpolated by an inertial navigation system (INS) using outputs from the travel state acquisition unit 14. Also, the navigation device provides guidance using voice or navigation display for the route to the destination when the control device 100 executes the manual driving mode. Note that the configuration for specifying the position of the vehicle 1 may be provided independently from the navigation device. The navigation device may be realized by one of functions of a terminal device such as a smartphone or a tablet terminal that the user owns, for example. In this case, information is transmitted and received through wired or wireless communication between the terminal device and the control device 100.

The travel state acquisition unit 14 is configured to acquire a current travel state of the vehicle 1. The travel state acquisition unit 14 includes a travel position acquisition unit 26, a vehicle speed acquisition unit 28, a yaw rate acquisition unit 30, a steering angle acquisition unit 32, and a travel trajectory acquisition unit 34.

The travel position acquisition unit 26 is configured to acquire the travel position of the vehicle 1 and the posture (travel direction) of the vehicle 1 as one example of a travel state. The travel position acquisition unit 26 includes various position measurement devices, for example, devices (a GPS receiver, a GNSS receiver, a beacon receiver, and the like) that receive electromagnetic waves transmitted from satellites and devices on streets and acquire position information (latitudes, longitudes, altitudes, coordinates, and the like), a gyro sensor, an acceleration sensor, and the like. The travel position of the vehicle 1 is measured with reference to a specific location of the vehicle 1.

The vehicle speed acquisition unit 28 is configured to acquire a velocity (vehicle speed) of the vehicle 1 as one example of a travel state. The vehicle speed acquisition unit 28 includes a speed sensor or the like provided at one or more wheels, for example.

The yaw rate acquisition unit 30 is configured to acquire a yaw rate of the vehicle 1 (a rotation angle speed about a vertical axis that passes through a gravity center of the vehicle) that is one of travel states. The yaw rate acquisition unit 30 includes a yaw rate sensor and the like, for example.

The steering angle acquisition unit 32 is configured to acquire a steering angle as one of travel states. The steering angle acquisition unit 32 includes a steering angle sensor or the like provided at a steering shaft, for example. Here, a steering angle speed and a steering angle acceleration are also acquired on the basis of the acquired steering angle.

The travel trajectory acquisition unit 34 is configured to acquire information regarding an actual travel trajectory of the vehicle 1 (actual travel trajectory) as one example of a travel state. The actual travel trajectory includes a trajectory (track) through which the vehicle 1 has actually traveled and may include a trajectory through which the vehicle 1 is scheduled to travel from now, for example, an extension on the front side in the travel direction of the trajectory (track) through which the vehicle 1 has traveled. The travel trajectory acquisition unit 34 includes a memory. The memory stores position information regarding a sequence of a series of dots included in the actual travel trajectory. Also, the extension can be predicted using a computer or the like.

The accelerator opening sensor 71, the brake depression amount sensor 73, and the steering angle sensor 75 that are operation detection sensors output an accelerator opening, a brake depression amount, and a steering angle that are detection results to the control device 100.

The shift switch 80 is a switch that is operated by an occupant of the vehicle 1. The shift switch 80 receives an operation performed by the occupant and switches driving modes (for example, the automated driving mode and the manual driving mode) in response to content of the received operation. For example, the shift switch 80 generates a driving mode designation signal for designating a driving mode of the vehicle 1 from the content of the operation performed by the occupant and outputs the driving mode designation signal to the control device 100.

In addition, the vehicle 1 according to the embodiment includes a shift device 60 that is operated by the driver via a shift lever. Positions of the shift lever (not illustrated) in the shift device 60 include parking (P), reverse travel (R), neutral (N), forward travel in an automated gear change mode (normal mode) (D), forward travel in a sport mode (S), and the like, as illustrated in FIG. 1. A shift position sensor 205 is provided in the vicinity of the shift device 60. The shift position sensor 205 detects the position of the shift lever operated by the driver. Information regarding the shift position detected by the shift position sensor 205 is input to the control device 100. Note that the information regarding the shift position detected by the shift position sensor 205 is output directly to the travel driving force output device 90 (AT-ECU 5 illustrated in FIG. 2) in the manual driving mode.

In addition, the vehicle 1 according to the embodiment includes a paddle switch 65 provided in the vicinity of the steering wheel 74. The paddle switch 65 is configured of a − switch (minus button) 66 for providing a shift-down command in a manual gear change mode during manual driving (manual driving mode) and a + switch (plus button) 67 for providing a shift-up command in a manual gear change mode. In the manual gear change mode of the automated transmission TM in the manual driving mode, operation signals of the minus button 66 and the plus button 67 are output to the vehicle control device 100, and shift-up or shift-down of a gear range set by the automated transmission TM is performed in accordance with the travel states or the like of the vehicle 1. Note that if either the minus button 66 and the plus button 67 is operated by the driver when the position of the shift lever is in the D range or the S range and the automated gear change mode is set, for example, during manual driving, the driving mode is switched from the automated gear change mode to the manual gear change mode (manual mode) according to the embodiment. Also, functions (functions that are different from those during the manual driving) that will be described below in detail are provided to operations of the paddle switch 65 during the automated driving.

The notification device 82 includes various devices capable of outputting information. The notification device 82 outputs information for promoting switching from the automated driving mode to the manual driving mode to the occupant of the vehicle 1, for example. As the notification device 82, at least one of a speaker, a vibrator, a display device, a light emitting device, and the like is used, for example.

The occupant identification unit 15 includes an in-vehicle camera capable of imaging the interior of the vehicle 1, for example. The in-vehicle camera may be a digital camera using a solid-state imaging element such as a CCD or a CMOS, a near-infrared camera combined with a near-infrared light source, or the like. The control device 100 can acquire an image captured by the occupant identification unit 15 (in-vehicle camera) and identify the current driver of the vehicle 1 from an image of the face of the driver of the vehicle 1 included in the image.

Figure 2:
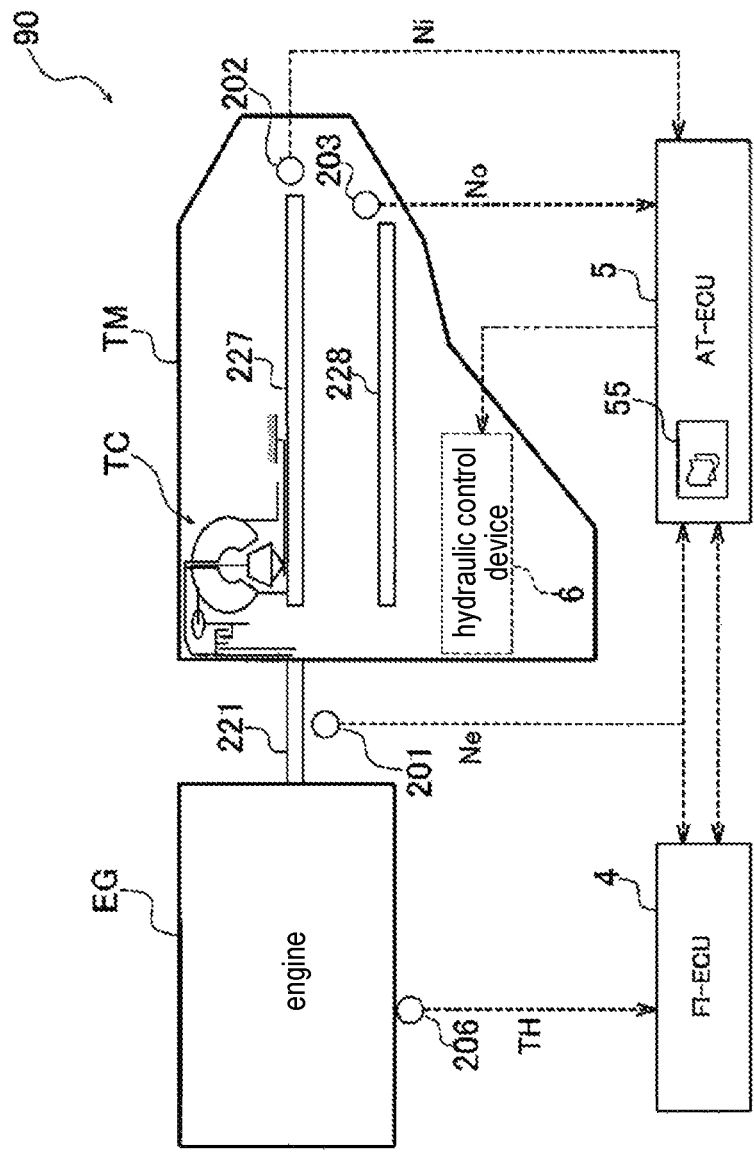
FIG. 2 is an outline diagram illustrating a configuration of a travel driving force output device (driving device) of a vehicle.

FIG. 2 is a functional configuration diagram of a travel driving force output device (driving device) 90 of the vehicle 1 according to the embodiment. The travel driving force output device 90 includes an internal combustion engine (engine) EG that is a drive source and an automated transmission TM that is coupled to the engine EG via a torque converter TC provided with a lockup clutch, and further, the travel driving force output device 90 includes an electronic control unit (FI-ECU) 4 that controls the engine EG and an AT-ECU 5 that controls the automated transmission TM.

In a case in which the travel driving force output device 90 is configured to include the engine EG and the automated transmission TM as in the embodiment, the FI-ECU 4 and the AT-ECU 5 cooperate with each other and control throttle opening of the engine EG, the shift range of the automated transmission TM, and the like in accordance with information input from the travel control unit 120, which is illustrated in FIG. 1 and will be described later, and outputs travel driving force (torque) used by the vehicle 1 to travel. Also, in a case in which the travel driving force output device 90 includes only the travel motor instead of the engine EG and the automated transmission TM, the motor ECU adjusts a duty ratio of a PWM (pulse width modulation) signal to be applied to the travel motor in accordance with information input from the travel control unit 120 and outputs the aforementioned travel driving force. In addition, in a case in which the travel driving force output device 90 includes the engine and the travel motor, both the FI-ECU 4 and the motor ECU cooperate with each other and control the travel driving force in accordance with information input from the travel control unit 120.

The steering device 92 includes an electric motor, for example. The electric motor causes force to act on a rack-and-pinion mechanism, for example, and changes an orientation of a steered wheel. The steering device 92 drives the electric motor and changes the orientation of the steered wheel in accordance with information input from the travel control unit 120.

The brake device 94 is an electric servo brake device that includes a brake caliper, a cylinder that delivers a hydraulic pressure to the brake caliper, an electric motor that causes the cylinder to generate a hydraulic pressure, and a brake control unit that controls the cylinder and the electric motor and controls brake of the brake caliper. The electric servo brake device is a braking force output device, the brake control unit controls the electric motor in accordance with the information input from the travel control unit 120 and controls a brake torque that outputs braking force in accordance with a brake operation output to the respective vehicles. The electric servo brake device may include, as a backup, a mechanism that delivers the hydraulic pressure generated through the operation of the brake pedal 72 to the cylinder via a master cylinder. Note that the brake device 94 is not limited to the aforementioned electric servo brake device and may be an electronic control-type hydraulic brake device. The electronic control-type hydraulic brake device controls an actuator in accordance with information input from the travel control unit 120 and delivers the hydraulic pressure of the master cylinder to the cylinder.

Next, referring again to FIG. 1, the control device 100 will be described. The control device 100 includes the automated driving control unit 110, the travel control unit 120, and the storage unit 140.

The respective components of the automated driving control unit 110 and a part or entirety of the travel control unit 120 are realized by a processor such as a central processing unit (CPU) executing programs. Also, a part or entirety thereof may be realized by hardware such as large scale integration (LSI) or an application specific integrated circuit (ASIC). In addition, the storage unit 140 is realized by a read only memory (ROM), a random access memory (RAM), a hard disk drive (HDD), a flash memory, or the like. The programs executed by the processor may be stored in the storage unit 140 in advance or may be downloaded from an external device via in-vehicle Internet equipment or the like. Also, the programs may be installed on the storage unit 140 by a portable storage medium that stores the programs being attached to a driving device, which is not illustrated in the drawing. In addition, the vehicle control device 100 may be implemented by a plurality of computer devices in a distributed manner. In this manner, it is possible to realize various kinds of processing in the embodiment by causing the in-vehicle computer in the vehicle 1 to cooperate with the aforementioned hardware functional units and software such as programs.

The storage unit 140 has map information 142, route information 144, and action plan information 146.

The map information 142 is map information that is more accurate than the navigation map that the route information acquisition unit 13 has and includes information regarding centers of lanes, information regarding boundaries of lanes, or the like, for example. More specifically, the map information 142 includes road information, traffic restriction information, address information (addresses, postal codes), facility information, telephone number information, and the like. The road information includes information representing types of roads such as highways, toll roads, national roads, prefectural roads, the numbers of lanes of the roads, widths of the lanes, gradients of roads, positions of roads, (three-dimensional coordinates including latitudes, longitudes, altitudes), curvatures of curves of lanes, positions of merging and branching points of lanes, traffic signs provided on roads, and the like. The traffic restriction information includes information regarding lane blockage due to construction, traffic accidents, traffic jams, and the like.

The route information 144 is one of elements stored in the storage unit 140 and for example, is a route from the position of the vehicle 1 specified by the GNSS receiver included in the navigation device of the route information acquisition unit 13 to the destination designated by the user.

The action plan information 146 is one of elements stored in the storage unit 140 and is information that indicates an action plan generated by the action plan generation unit 116 of the automated driving control unit 110 on the basis of the map information acquired by the route information acquisition unit 13.

The automated driving control unit 110 includes a host vehicle position recognition unit 112, an external environment recognition unit 114, an action plan generation unit 116, a target travel state setting unit 118.

The automated driving control unit 110 performs control by switching the driving modes in accordance with a signal input from the shift switch 80. Although the driving modes include a driving mode in which accelerating/decelerating and steering of the vehicle 1 are automatically controlled (automated driving mode) and a driving mode in which accelerating/decelerating of the vehicle 1 is controlled on the basis of human operations performed on the operation devices such as the accelerator pedal 70 and the brake pedal 72 and steering is controlled on the basis of human operations performed on the operation devices such as the steering wheel 74 (manual driving mode), the driving modes are not limited thereto. As another driving mode, for example, a driving mode in which one of accelerating/decelerating and steering of the vehicle 1 is automatically controlled and the other is controlled on the basis of human operations performed on the operation devices (semi-automated driving mode). Note that "automated driving" in the following description is assumed to include the semi-automated driving mode in addition to the aforementioned automated driving mode.

Note that the automated driving control unit 110 may stop operations, and an input signal from the operation detection sensors 71, 73, and 75 may be output to the travel control unit 120 without being output to the automated driving control unit 110 or may be supplied directly to the travel driving force output device 90 (the FI-ECU 4 or the AT-ECU 5), the steering device 92, or the brake device 94 when the manual driving mode is performed.

The host vehicle position recognition unit 112 recognizes the lane (travel lane) through which the vehicle 1 is traveling and the relative position of the vehicle 1 with respect to the travel lane on the basis of the map information 142 stored in the storage unit 140 and the information input from the outer condition acquisition unit 12, the route information acquisition unit 13, or the travel state acquisition unit 14.

The host vehicle position recognition unit 112 recognizes, as the relative position of the vehicle 1 with respect to the travel lane, a distance between a reference point (a gravity center, for example) of the vehicle 1 and the center of the travel lane and an angle relative to a line connecting the center of the travel line in the travel direction of the vehicle 1, for example. Note that the host vehicle position recognition unit 112 may recognize, as the relative position of the vehicle 1 with respect to the travel lane, the position of the reference point of the vehicle 1 relative to any side end of the travel line instead of this.

The external environment recognition unit 114 recognizes states of vehicles in the surroundings, such as the positions, the speeds, and the acceleration on the basis of the information input from the outer condition acquisition unit 12 or the like. The vehicles in the surroundings according to the embodiment are other vehicles that travel in the surroundings of the vehicle 1 in the same direction as that of the vehicle 1. The positions of the vehicles in the surroundings may be represented by representative points such as the gravity center or corners of the vehicle 1 or may be represented by a region expressed with an outline of the vehicle 1. The "states" of the vehicles in the surroundings may include acceleration of the vehicles in the surroundings and whether or not the vehicles have experienced lance change (or whether or not the vehicles are trying to change lanes) on the basis of the information from the aforementioned various machines. Also, the external environment recognition unit 114 may recognize positions of a guard rails, poles, parked vehicles, pedestrians, and other objects in addition to the vehicles in the surroundings.

The action plan generation unit 116 sets an automated driving start point, an automated driving end scheduled point, and/or an automated driving destination. The automated driving start point may be a current position of the vehicle 1 or may be a point at which an operation of providing a command for automated driving is provided by the occupant of the vehicle 1.

The action plan generated by the action plan generation unit 116 is configured of a plurality of events that are executed at the respective predetermined points of the road along which the vehicle will travel next in order, for example. The events include a deceleration event of decelerating the vehicle 1, an acceleration event of accelerating the vehicle 1, a lane keeping event of causing the vehicle 1 to travel without departing from the travel lane, a lane change event of causing the vehicle 1 to change the travel lane, a overtaking event of causing the vehicle 1 to overtake a vehicle traveling in front of the vehicle 1, a branching event of causing the vehicle 1 to change a lane to a desired lane at a branching point or causing the vehicle 1 to travel departing from the current travel lane, and a merging event of causing the vehicle 1 to accelerate or decelerate in the merging lane for merging with a main lane and change the travel lane, for example The target travel state setting unit 118 is configured to set a target travel state that is a travel state targeted by the vehicle 1 on the basis of the action plan decided by the action plan generation unit 116 and the various kinds of information acquired by the outer condition acquisition unit 12, the route information acquisition unit 13, and the travel state acquisition unit 14.

The target travel state setting unit 118 includes a target value setting unit 52, a target trajectory setting unit 54, a deviation acquisition unit 42, and a correction unit 44.

The target trajectory setting unit 54 is configured to set target trajectory information of the vehicle 1 (also simply referred to as a target trajectory) on the basis of the outer conditions acquired by the outer condition acquisition unit 12 and travel route information acquired by the route information acquisition unit 13. The target trajectory includes information regarding a target position of each unit time. Each target position is associated with posture information (travel direction) of the vehicle 1. Also, each target position may be associated with target value information such as a vehicle speed, acceleration, a yaw rate, lateral G force, a steering angle, a steering angle speed, and a steering angular acceleration. The aforementioned target position, target vehicle speed, target yaw rate, and target trajectory are information indicating the target travel state.

The deviation acquisition unit 42 is configured to acquire deviation of an actual travel state with respect to the target travel state on the basis of the target travel state set by the target value setting unit 52 and the target trajectory setting unit 54 of the target travel state setting unit 118 and the actual travel state acquired by the travel state acquisition unit 14.

The correction unit 44 is configured to correct the target travel state in accordance with the deviation acquired by the deviation acquisition unit 42. Specifically, the correction unit 44 sets a new target travel state by causing the target travel state set by the target travel state setting unit 118 to further approach the actual travel state acquired by the travel state acquisition unit 14 as the deviation increases.

The travel control unit 120 is configured to include an acceleration and deceleration command unit 56 and a steering command unit 58 and control traveling of the vehicle 1. Specifically, the travel control unit 120 outputs a command value for travel control to the aforementioned travel driving force output device 90, the steering device 92, and the brake device 94 such that the actual travel state of the vehicle 1 is caused to coincide with or approach the target travel state set by the target travel state setting unit 118 or the new target travel state set by the correction unit 44.

The acceleration and deceleration command unit 56 is configured to control accelerating/decelerating in the travel control for the vehicle 1. Specifically, the acceleration and deceleration command unit 56 arithmetically operates an acceleration and deceleration command value for causing the travel state of the vehicle 1 to coincide with the target travel state on the basis of the target travel state (target acceleration and deceleration) set by the target travel state setting unit 118 or the correction unit 44 and the actual travel state (actual acceleration or deceleration).

The steering command unit 58 is configured to control steering in the travel control for the vehicle 1. Specifically, the steering command unit 58 arithmetically operates a steering angular speed command value for causing the travel state of the vehicle 1 to coincide with the target travel state on the basis of the target travel state set by the target travel state setting unit 118 or the correction unit 44 and the actual travel state.

Next, referring again to FIG. 2, the travel driving force output device 90 will be described. The rotation output of the engine EG is output to a crankshaft (the output shaft of the engine EG) 221 and is delivered to the input shaft 227 of the automated transmission TM via the torque converter TC. The automated transmission TM is a transmission that performs gear change for rotation using the driving force delivered from the engine EG to the input shaft 227 and outputs the rotation from the output shaft 228 to the drive wheels and is an automated transmission with stages in which a plurality of transmission ranges for forward traveling and one transmission range for backward traveling are able to be set.

In addition, the travel driving force output device 90 includes an fuel injection control device (FI-ECU) 4 that electronically controls the engine EG, an automated transmission control device (AT-ECU) 5 that electronically controls the automated transmission TM including the torque converter TC, and a hydraulic control device 6 that performs rotation drive and lock-up control of the torque converter TC in accordance with control performed by the AT-ECU 5 and hydraulic control of fastening (engagement)/release of a plurality of friction engagement mechanisms included in the automated transmission TM.

The vehicle 1 includes a crankshaft rotational frequency sensor 201, an input shaft rotational frequency sensor 202, and an output shaft rotational frequency sensor 203. The crankshaft rotational frequency sensor 201 detects a rotational frequency Ne of the crankshaft 221 (engine EG), and the rotational frequency Ne is provided to the AT-ECU 5. The input shaft rotational frequency sensor 202 detects a rotational frequency (the input shaft rotational frequency of the automated transmission TM) Ni of the input shaft 227, and the rotational frequency Ni is provided to the AT-ECU 5 and the fuel ejection control device (FI-ECU) 4. The output shaft rotational frequency sensor 203 detects a rotational frequency (the output shaft rotational frequency of the automated transmission TM) No of the output shaft 228, and the rotational frequency No is provided to the AT-ECU 5. Then, the AT-ECU 5 calculates vehicle speed data from the rotational frequency data Ne, Ni, and No detected by the respective sensors 201 to 203. Also, the vehicle 1 includes a throttle opening sensor 206. The throttle opening sensor 206 detects throttle opening TH of the engine EG, and data of the throttle opening TH is provided to the FI-ECU 4.

Also, the AT-ECU 5 that controls the automated transmission TM has shift maps (gear change properties) 55 that define a region of gear ranges that can be set by the automated transmission TM in accordance with the vehicle speed detected by the vehicle speed sensor of the vehicle speed acquisition unit 28 and the acceleration opening detected by the accelerator opening sensor 71. As the shift maps 55, shift maps of a plurality of types with different properties that include upshift lines and downshift lines set for the respective gear ranges are prepared in advance. In the gear change control performed by the automated transmission TM, the AT-ECU 5 performs control for switching the gear range of the automated transmission TM in accordance with a shift map selected from the shift maps of a plurality of types.

In the vehicle 1, the automated driving control unit 110 performs automated driving control of the vehicle 1 in a case in which the automated driving mode is selected by a driver's operation on the shift switch 80. In the automated driving control, the automated driving control unit 110 ascertains the current travel state (an actual travel trajectory, a travel position, and the like) of the vehicle 1 on the basis of information acquired from the outer condition acquisition unit 12, the route information acquisition unit 13, the travel state acquisition unit 14, and the like or information recognized by the host vehicle position recognition unit 112 and the external environment recognition unit 114. The target travel state setting unit 118 sets a target travel state (a target trajectory and a target position) that is a target travel state of the vehicle 1 on the basis of the action plan generated by the action plan generation unit 116. The deviation acquisition unit 42 acquires a deviation of the actual travel state relative to the target travel state. The travel control unit 120 performs travel control such that the travel state of the vehicle 1 coincides with or approaches the target travel state in a case in which a deviation is acquired by the deviation acquisition unit 42.

The correction unit 44 corrects a target trajectory or a target position on the basis of the travel position acquired by the travel position acquisition unit 26. The travel control unit 120 performs accelerating/decelerating control of the vehicle 1 using the travel driving force output device 90 and the brake device 94 on the basis of the vehicle speed and the like acquired by the vehicle speed acquisition unit 28 such that the vehicle 1 conforms to the new target trajectory or target position.

Also, the correction unit 44 corrects the target trajectory on the basis of the travel position acquired by the travel position acquisition unit 26. The travel control unit 120 performs steering control using the steering device 92 on the basis of the steering angle speed acquired by the steering angle acquisition unit 32 such that the vehicle 1 follows the new target trajectory.

Figure 3:
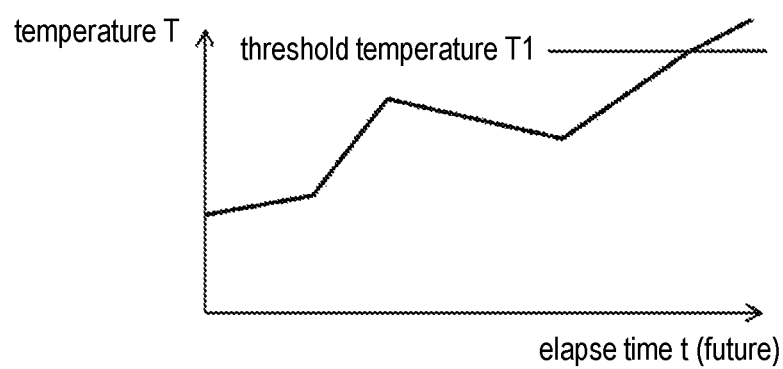
FIG. 3 is a graph illustrating a model of change in temperature of a brake device when the vehicle travels along a downhill road with a changing gradient, which is a road along which the vehicle will travel next in an automated driving mode, using a brake device.

Here, the vehicle 1 has a brake function using the brake device (mechanical braking mechanism) 94 and the engine brake (internal combustion engine braking mechanism) that uses the engine EG and the automated transmission TM to generate braking force. FIG. 3 is a graph illustrating a model of change in temperature of the brake device 94 when the vehicle travels on a downhill road with changing gradient as a road, along which the vehicle 1 will travel next in the automated driving mode, using the brake device 94. In the graph illustrated in the drawing, the vertical axis represents the temperature T of the brake device 94 (the temperature of the brake disk), and the horizontal axis represents an elapsed time t in the future from the current point. If the temperature T of the brake device 94 becomes equal to or greater than a threshold temperature T1 in the graph illustrated in the drawing, there is a concern that a fading (a decrease in braking force) phenomenon may occur in the brake device 94. That is, if the brake device 94 is continuously used for a long period of time during traveling of the vehicle 1, there is a concern that fading may occur due to the temperature (of the brake disk) reaching the threshold temperature T1. Thus, it is necessary also to use the engine brake that is not a friction brake in order to prevent a fading phenomenon when the vehicle 1 travels along a long downhill road.

Next, advantages and disadvantages in a case of traveling mainly using the brake device 94 (wheel brake) at the time of traveling along a downhill road and advantages and disadvantages in a case of traveling mainly using the engine brake at the time of traveling along a downhill road during traveling of the vehicle 1 in the automated driving mode will be described with reference to FIGS. 4 and 5.

Figure 4:
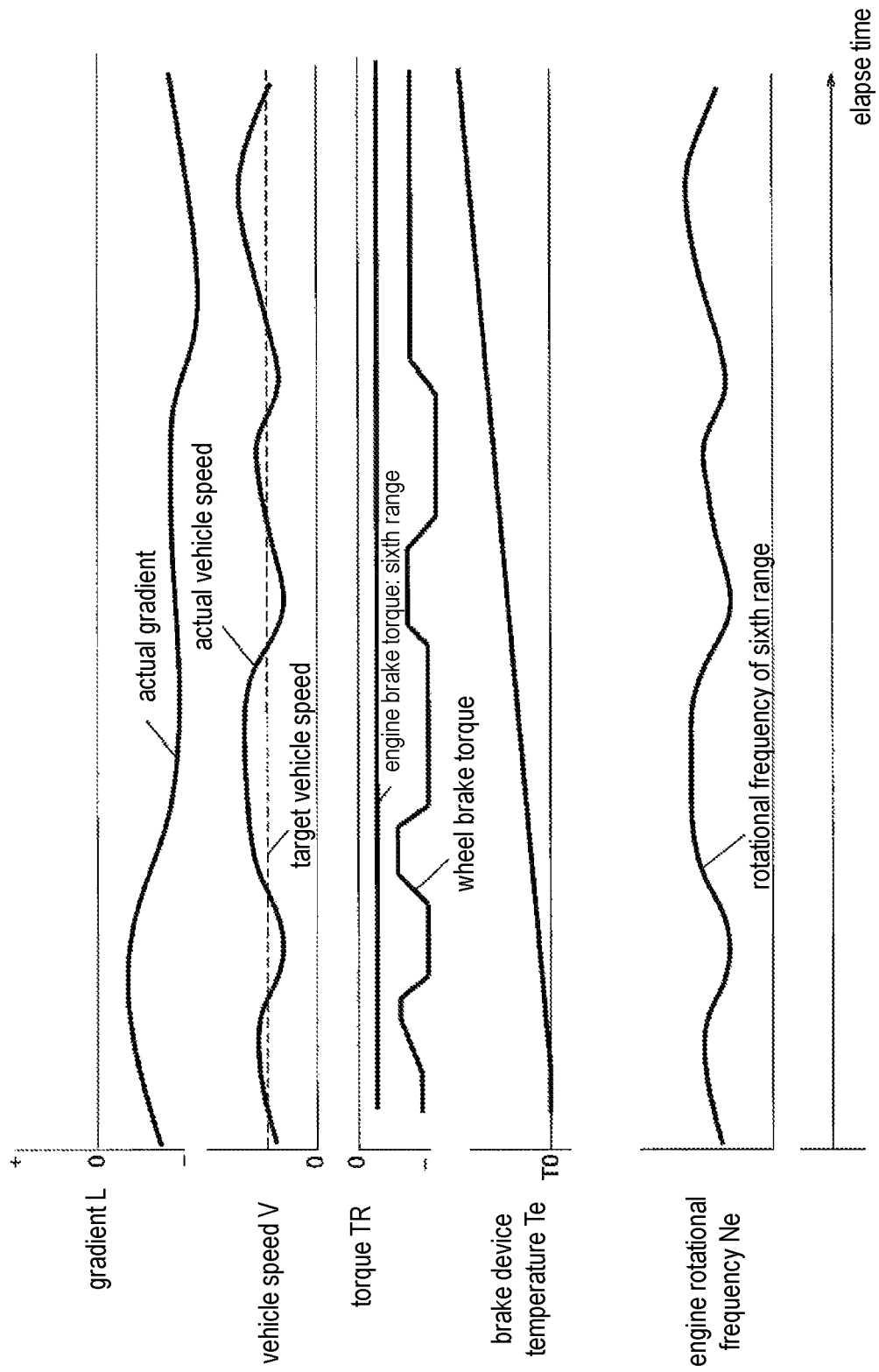
FIG. 4 is a graph illustrating a correlation of a gradient, a vehicle speed, a torque, a temperature of the brake device, and an engine rotational frequency in a case in which the vehicle is decelerated mainly using the brake device when the vehicle travels along a downhill road.

FIG. 4 is a graph illustrating correlations of a gradient L, a vehicle speed V, a torque TR, a temperature Te of the brake device 94, and an engine rotational frequency Ne in a case of mainly using the brake device 94 (wheel brake) at the time of traveling along a downhill. In the example of the graph, there are correlations described below.

(1A) The actual gradient of the traveling road surface is negative due to a downhill. Therefore, there is a trend that the vehicle speed V increases when the accelerator opening AP is zero (accelerator off) and the brake is off.

(2A) The vehicle speed (actual vehicle speed) V changes while increasing and decreasing with respect to the target vehicle speed and varies depending on the inclination of the downward gradient and brake control.

(3A) Although both a torque caused by the engine brake with sixth gear range of the automated transmission TM and a torque (wheel brake torque) caused by the brake device 94 act as the torque TR, the absolute value of the torque (wheel brake torque) caused by the brake device 94 is larger than that of the engine brake (a value indicating larger deceleration force since the value is a negative value).

(4A) The temperature (disk temperature) Te of the brake device 94 gradually increases from an initial temperature T0 since the wheel brake is constantly used.

(5A) The engine rotational frequency Ne gradually changes in a wave shape with the rotational frequency of the sixth gear range.

Therefore, since there are correlations (1A) to (5A) as described above in a case of mainly using the brake device 94 (wheel brake) at the time of traveling along the downhill, there are advantages that rotation sound of the engine EG does not become loud and that impact due to downshifting of the automated transmission TM does not occur, and there is a disadvantage that the temperature of the brake device 94 becomes high.

Figure 5:
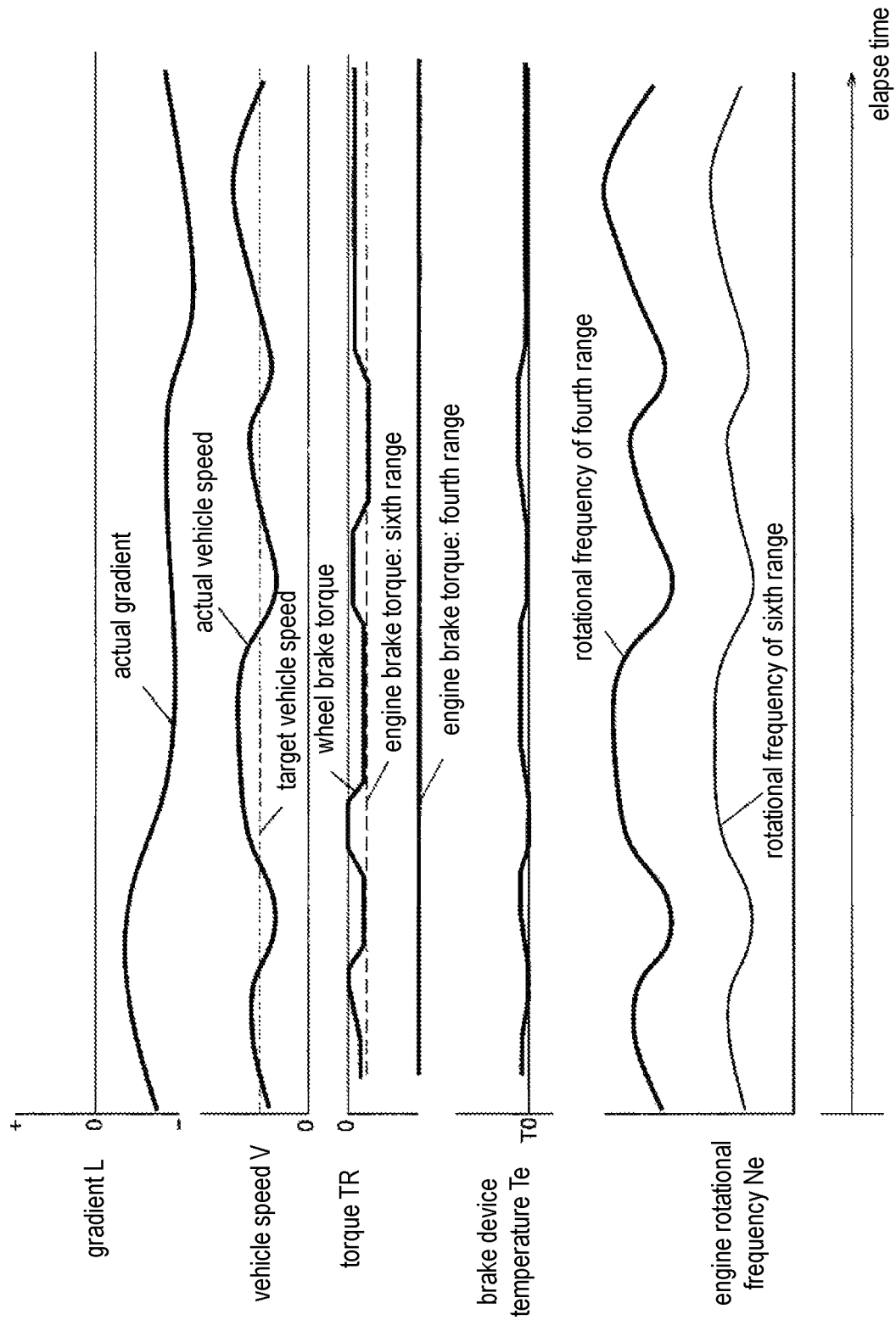
FIG. 5 is a graph illustrating a correlation of a gradient, a vehicle speed, a torque, a temperature of the brake device, and an engine rotational frequency in a case in which the vehicle is decelerated mainly using an engine brake when the vehicle travels along a downhill road.

FIG. 5 is a graph illustrating correlations of a gradient L, a vehicle speed V, a torque TR, a temperature Te of the brake device 94, and the engine rotational frequency Ne in a case of mainly using the engine brake at the time of traveling along a downhill. In the example of the graph, there are correlations as follows.

(1B) The actual gradient of the traveling road surface is negative due to the downhill similarly to (1A). Therefore, there is a trend that the vehicle speed V increases when the accelerator opening AP is zero (accelerator off) and the brake is off.

(2B) The vehicle speed (actual vehicle speed) V changes while increasing and decreasing with respect to the target vehicle speed and varies depending on the inclination of the downward gradient and brake control similarly to (2A).

(3B) Although both a torque caused by the engine brake with fourth gear range of the automated transmission TM and a torque (wheel brake torque) caused by the brake device 94 act as the torque TR, the absolute value of the torque caused by the engine brake with the fourth gear range is larger than that of the engine brake with the sixth gear range (a value indicating larger deceleration force since the value is a negative value).

(4B) The temperature Te of the brake device 94 does not tend to rise with respect to the initial temperature T0 since the utilization frequency of the brake device 94 decreases.

(5B) The engine rotational frequency changes in a wave shape with the rotational frequency of the fourth gear range that is higher than the rotational frequency of the sixth gear range.

Therefore, since there are correlations (1B) to (5B) described above in the case of mainly using the engine brake, there is an advantage that the temperature of the brake device 94 does not tend to be high due to a decrease in utilization frequency of the brake device 94 (wheel brake). Meanwhile, there are disadvantages that variation in deceleration (gear change impact) due to downshifting (sixth gear range→fourth gear range) occurs and that rotation sound of the engine EG becomes loud due to the high rotational frequency of the engine EG with the gear range on the side of the lower gear range. Note that although it is possible to avoid variation in deceleration if downshifting is performed in advance on the basis of gradient information, it is not possible to avoid an increase in the rotation sound of the engine EG due to an increase in the rotational frequency of the engine EG with the gear range on the side of the lower gear range even in that case.

Thus, according to the control device for the vehicle 1 according to the embodiment, control is performed in which requested braking force that is braking force for decelerating the vehicle to the target vehicle speed is calculated, the predicted temperature T of the brake device 94 in a case in which the requested braking force is achieved by the brake device 94 is calculated, and utilization proportions of the braking force caused using the brake device 94 and the braking force caused using the engine brake for the requested braking force are decided on the basis of the calculated predicted temperature T in the action plan that includes the target vehicle speed sequence decided on the basis of the route information acquired in advance, in the automated driving mode. In this manner, both the advantage achieved by using the brake device 94 (wheel brake) at the time of traveling along a downhill road and the advantage achieved by using the engine brake can be obtained, and also, it is possible to avoid the disadvantage of using the brake device 94 (wheel brake) and the disadvantage of using the engine brake in the traveling of the vehicle in the automated driving mode. Hereinafter, the control will be described in detail.

In a case in which the predicted temperature T of the brake device 94 is less than the threshold temperature T1 (predetermined value) in the automated driving mode, the acceleration and deceleration command unit 56 performs control such that the requested braking force is satisfied using the engine brake and the brake device 94 without changing the gear ratio of the automated transmission TM. In this manner, it is possible to prevent the NV reduction performance from deteriorating by decelerating the vehicle using the engine brake and the brake device 94 without performing downshifting. Meanwhile, in a case in which the predicted temperature T of the brake device 94 is equal to or greater than the threshold temperature T1, the acceleration and deceleration command unit 56 performs control such that the gear ratio of the automated transmission TM becomes high. In this manner, it is possible to achieve the requested braking force by performing downshifting and using the engine brake and thereby to prevent excessive heating of the brake device 94.

The target value setting unit 52 is configured to set information regarding the travel position (latitudes, longitudes, altitudes, coordinates, and the like) targeted by the vehicle 1, the aforementioned target vehicle speed sequence, and yaw rate target value information (also simply referred to as a target yaw rate) in the aforementioned control. The target value setting unit 52 calculates the target vehicle speed sequence on the basis of the gradient sequence of the road along which the vehicle will travel next, the curvature, the road surface information, or the traffic jam information in order to travel at an appropriate vehicle speed. The gradient sequence is taken into consideration in order to set the target travel state in accordance with how the gradient of the road along which the vehicle will travel next inclines and declines. The curvature is taken into consideration in order to set the target travel state in accordance with what kind of cornering the road along which the vehicle will travel next includes. The traffic jam information is taken into consideration since the amount of heat generated by the brake device 94 changes depending on whether or not the vehicle stops at a midpoint.

The action plan decided by the action plan generation unit 116 includes a plurality of events in relation to gradient sequences and curvatures that are executed in order at the respective predetermined points on the road along which the vehicle will travel next such that it is possible to travel at an appropriate vehicle speed in consideration of the gradient sequences and the curvatures of the road, and the target trajectory setting unit 54 is configured to set the vehicle speed, the acceleration, the deceleration, and the yaw rate corresponding to the plurality of events in relation to the gradient sequences and the curvatures.

The target value setting unit 52 sets the target travel state including the target vehicle speed sequence that defines target value information (also simply referred to as a target vehicle speed) of the vehicle speed at the respective predetermined points at least on the road along which the vehicle will travel next in the automated driving mode. Then, in a case in which the target vehicle speed is achieved by deceleration, the requested braking force that is braking force for decelerating the vehicle to the target vehicle speed is calculated. Then, the temperature (predicted temperature) of the brake device 94 when the requested braking force is achieved by the brake device (mechanical braking mechanism) 94 is calculated, and the utilization proportion of the brake device 94 for the requested braking force is decided on the basis of the calculated predicted temperature of the brake device 94. In this manner, it is possible to reliably prevent excessive heating of the brake device 94 by deciding the utilization proportion of the brake device 94 for the requested braking force on the basis of the predicted temperature. Therefore, it is possible to predict the temperature in the future, to selectively use the engine brake (internal combustion engine braking mechanism) and the brake device (mechanical braking mechanism) 94 while realizing both the NV reduction performance and the safety, and to achieve the requested braking force by acquiring the map information and creating the action plan when the vehicle is traveling by automated driving.

Also, the target value setting unit 52 performs control such that the utilization proportion of the brake device 94 for the requested braking force is higher in the case in which the predicted temperature T of the brake device 94 is less than the threshold temperature T1 (predetermined temperature) illustrated in FIG. 3 than in the case in which the predicted temperature T of the brake device 94 is equal to or greater than the threshold temperature T1. In this manner, it is possible to prevent the NV reduction performance from deteriorating due to the downshifting of the automated transmission TM by frequently and safely using the brake device 94.

Meanwhile, the target value setting unit 52 performs control such that the utilization proportion of the brake device 94 for the requested braking force is lower in the case in which the predicted temperature T of the brake device 94 is equal to or greater than the threshold temperature T1 than in the case in which the predicted temperature T of the brake device 94 is less than the threshold temperature T1. In this manner, it is possible to prevent excessive heating of the brake device 94 by reducing the utilization of the brake device 94.

Figure 6:
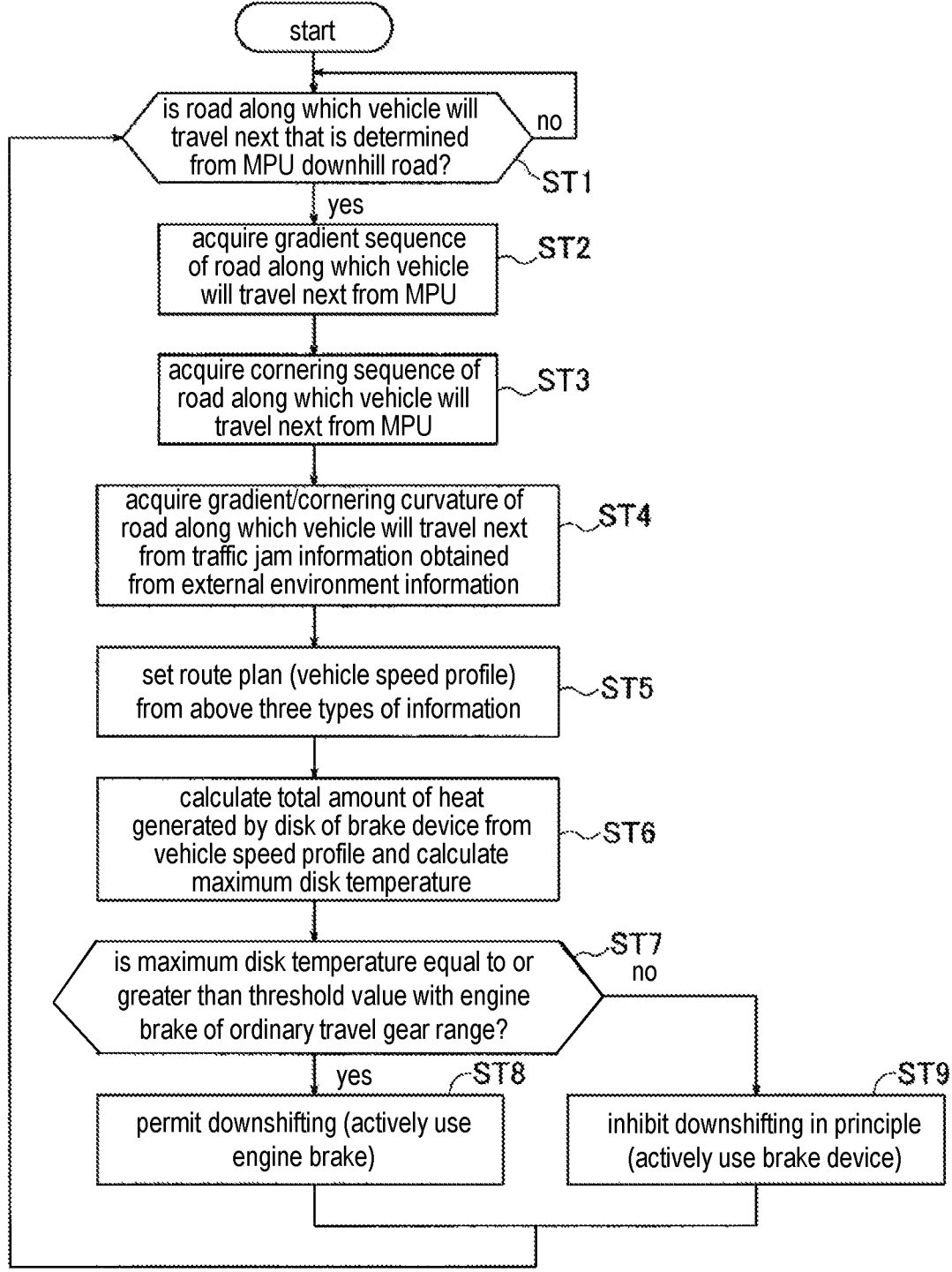
FIG. 6 is a flowchart illustrating a procedure for controlling accelerating/decelerating of the vehicle by illustrating which timing the brake is to be applied or released in an action plan.

Here, a procedure for control of selectively using the braking force caused using the engine brake and the braking force caused using the brake device 94 on the basis of the calculated predicted temperature of the brake device 94 will be described. FIG. 6 is a flowchart illustrating a control procedure for selectively using the braking force caused using the engine brake and the braking force caused using the brake device 94 in a case in which the road along which the vehicle will travel next is a downhill road, in the automated driving mode. In the flow illustrated in the drawing, it is determined whether or not the road along which the vehicle will travel next that is determined from a highly accurate map (MPU) of the map information 142 stored in the storage unit 140 is a downhill road first (ST1). In a case in which it is determined that the road along which the vehicle will travel next is a downhill road as a result (YES), then a gradient sequence that defines a gradient at the respective predetermined points on the road along which the vehicle will travel next from MPU (ST2), then acquires a cornering sequence that defines cornering at each predetermined location on the road along which the vehicle will travel next from MPU (ST3), then acquires a gradient/a cornering curvature of the road along which the vehicle will travel next from traffic jam information obtained from outer conditions (eternal environment conditions) acquired by the outer condition acquisition unit 12 (ST4), and then sets a route plan (vehicle speed profile) from the information obtained through the aforementioned three steps (ST2, ST3, and ST4) (ST5). Then, the total amount of heat generated by the disk of the brake device 94 is calculated from the vehicle speed profile, and the maximum disk temperature is calculated (ST6). Then, it is determined whether or not the maximum disk temperature in a case in which the engine brake with an ordinary travel gear range (gear range) is used is equal to or greater than the threshold temperature T1 (ST7). When the maximum disk temperature is equal to or greater than the threshold temperature T1 (YES) as a result of the determination, downshifting is permitted, and the engine brake is actively used (ST8). Specifically, the gear range with which it is possible to curb fading is selected (downshifting is performed to increase the proportion of the engine brake), and the processing returns to the initial step (ST1). Also, if the maximum disk temperature is less than the threshold temperature T1 (NO) as a result of the aforementioned determination in Step ST7, the downshifting is inhibited in principle, and the brake device 94 is actively used (ST9). Specifically, the brake device 94 (wheel brake) is actively used, and the downshifting is habited as long as the rotation does not become low, and the processing returns to the initial step (ST1).

As can be understood from the flowchart in FIG. 6, the control device for the vehicle 1 according to the embodiment can predict the temperature of the brake device 94 in the future and selectively use the engine brake and the brake device 94 while realizing both the NV reduction performance and the safety by acquiring the map information and creating the action plan.

As described above, according to the control device for the vehicle 1 in the embodiment, the utilization proportion of the brake device 94 for the requested braking force is decided on the basis of the predicted temperature of the brake device 94 in the control for achieving the requested braking force in the target vehicle speed sequence included in the action plan decided in the automated driving mode. In this manner, it is possible to more reliably prevent excessive heating of the brake device 94 on the route along which the vehicle will travel next in the automated driving mode by deciding the utilization proportion of the brake device 94 on the basis of the predicted temperature. Therefore, it is possible to utilize the brake device 94 to the maximum extent and thereby to improve the NV reduction performance when the vehicle 1 is decelerated while preventing excessive heating of the brake device 94.

Also, the case in which the predicted temperature T of the brake device 94 is calculated to achieve the requested braking force using the brake device 94 has been described in the embodiment. However, instead of this configuration, the acceleration and deceleration command unit 56 may calculate the temperature of the brake device 94 to the temperature during traveling when the vehicle 1 traveling in the automated driving mode is decelerated and decide (change) the utilization proportions of the engine brake and the brake device 94 on the basis of the calculated value of the temperature during traveling. Specifically, the temperature of the brake device 94 may be calculated as the temperature during traveling when the vehicle 1 is decelerated during traveling, and in a case in which the calculated of the value of the temperature during traveling is equal to or greater than the predetermined value, a control may be performed such that the gear ratio of the automated transmission TM becomes high. In this manner, it is possible to more reliably prevent excessive heating of the brake device 94 in consideration not only of the predicted temperature obtained by calculation performed in advance but also an actual temperature obtained by taking the heat discharge during traveling and the like into consideration. Note that although not illustrated in the drawing, a temperature sensor for measuring the temperature of the brake disk may be provided in order to calculate an accurate temperature of the brake disk of the brake device 94. In addition, a configuration in which a calorimeter is provided to detect the amount of heat generated by the friction surface of the brake disk and the temperature of the brake device 94 is calculated on the basis of the amount of heat generated by the brake device 94 at the time of braking may be employed.

Also, the aforementioned embodiment describes the case in which the vehicle 1 is a vehicle that uses the engine EG as a power source and the braking force caused by the power source braking mechanism is the engine brake caused by the engine EG and the automated transmission TM in the disclosure. However, instead of this configuration, a traveling motor and a motor ECU for controlling the traveling motor may be provided as the traveling driving force output device 90 in a case in which the vehicle 1 is an electric vehicle that uses a motor (traveling motor) as a power source. Also, in a case in which the vehicle 1 is a hybrid vehicle, the engine, the engine ECU, the traveling motor, and the motor ECU may be provided. In this manner, it is possible to use a regenerative brake using the traveling motor as the braking force caused using the power source braking mechanism in the disclosure instead of the aforementioned engine brake in the case in which the travel driving force output device 90 includes the traveling motor as a drive source.

Although the embodiments of the disclosure have been described above, the disclosure is not limited to the aforementioned embodiments, and various modifications can be made within the scope of the claims and the scope of the technical ideas described in the specification and the drawings. For example, although the automated driving mode when the aforementioned gear range switching control is performed is for automatically controlling both the steering angle and the accelerating/decelerating of the vehicle 1, the driving mode when target accelerating/decelerating correction control is performed may be a semi-automated driving mode for automatically controlling only the accelerating/decelerating of the vehicle 1 instead of the automated driving mode described above.

What is claimed is:

1. A control device for a vehicle, capable of operating in an automated driving mode for automatically controlling at least accelerating/decelerating of steering and accelerating/decelerating of a vehicle, the control device comprising:
   a route information acquisition unit that is capable of acquiring a route information of a route along which the vehicle will travel next on a basis of map information; and
   an automated driving control unit that decides an action plan on a basis of the route information acquired by the route information acquisition unit,
   wherein the action plan includes a target vehicle speed sequence that defines a target vehicle speed at respective predetermined points at least on a road along which the vehicle will travel next,
   the vehicle is capable of performing deceleration using a power source braking mechanism that uses a braking force of a power source and deceleration using a mechanical braking mechanism that applies a mechanical braking force to rotation of wheels as a way for decelerating the vehicle, and
   the automated driving control unit
      calculates a requested braking force that is a braking force for decelerating the vehicle to a target vehicle speed in a case in which the target vehicle speed is achieved by decelerating the vehicle,
      calculates a predicted temperature of the mechanical braking mechanism in a case in which the requested braking force is achieved by the mechanical braking mechanism, and
      decides utilization proportions of the power source braking mechanism and the mechanical braking mechanism with respect to the requested braking force on a basis of the calculated predicted temperature of the mechanical braking mechanism.

2. The control device for a vehicle according to claim 1, wherein a control is performed such that in a case in which a value of the predicted temperature of the mechanical braking mechanism is less than a predetermined value, the utilization proportion of the mechanical braking mechanism for the requested braking force is increased, as compared with a case in which the value of the predicted temperature of the mechanical braking mechanism is equal to or greater than the predetermined value.

3. The control device for a vehicle according to claim 1, wherein a control is performed such that in a case in which a value of the predicted temperature of the mechanical braking mechanism is equal to or greater than a predetermined value, the utilization proportion of the mechanical braking mechanism for the requested braking force is decreased, as compared with a case in which the value of the predicted temperature of the mechanical braking mechanism is less than the predetermined value.

4. The control device for a vehicle according to claim 1, wherein the power source braking mechanism is an internal combustion engine braking mechanism that causes a braking force using an internal combustion engine and a transmission mechanism, and
   a control is performed such that the requested braking force is satisfied by the internal combustion engine braking mechanism and the mechanical braking mechanism without changing a gear ratio of the transmission mechanism in the case in which a value of the predicted temperature of the mechanical braking mechanism is less than the predetermined value.

5. The control device for a vehicle according to claim 1, wherein the power source braking mechanism is an internal combustion engine braking mechanism that causes a braking force using an internal combustion engine and a transmission mechanism, and a control is performed such that a gear ratio of the transmission mechanism is increased in the case in which a value of the predicted temperature of the mechanical braking mechanism is equal to or greater than the predetermined value.

6. The control device for a vehicle according to claim 5, wherein the automated driving control unit calculates a temperature of the mechanical braking mechanism as a temperature during traveling when the vehicle is decelerated while traveling, and in a case in which a calculated value of the temperature during traveling is equal to or greater than a predetermined value, the automated driving control unit performs a control such that a gear ratio of the transmission mechanism is increased.

7. The control device for a vehicle according to claim 6, wherein the automated driving control unit calculates the temperature during traveling of the mechanical braking mechanism on a basis of an amount of heat generated by the mechanical braking mechanism during braking.

8. The control device for a vehicle according to claim 1, wherein the action plan includes a gradient sequence of the road along which the vehicle will travel next.

9. The control device for a vehicle according to claim 1, wherein the action plan includes curvatures of the road along which the vehicle will travel next.

10. The control device for a vehicle according to claim 9, wherein the target vehicle speed sequence of the road along which the vehicle will travel next is calculated on a basis of the gradient sequence or the curvatures.

11. The control device for a vehicle according to claim 10, wherein the target vehicle speed sequence of the road along which the vehicle will travel next is calculated on a basis of a road surface information.

12. The control device for a vehicle according to claim 10, wherein the target vehicle speed sequence of the road along which the vehicle will travel next is calculated on a basis of a traffic jam information.

13. The control device for a vehicle according to claim 4, wherein the automated driving control unit calculates a temperature of the mechanical braking mechanism as a temperature during traveling when the vehicle is decelerated while traveling, and in a case in which a calculated value of the temperature during traveling is equal to or greater than a predetermined value, the automated driving control unit performs a control such that a gear ratio of the transmission mechanism is increased.

14. The control device for a vehicle according to claim 13, wherein the automated driving control unit calculates the temperature during traveling of the mechanical braking mechanism on a basis of an amount of heat generated by the mechanical braking mechanism during braking.

15. The control device for a vehicle according to claim 8, wherein the target vehicle speed sequence of the road along which the vehicle will travel next is calculated on a basis of the gradient sequence or the curvatures.

16. The control device for a vehicle according to claim 15, wherein the target vehicle speed sequence of the road along which the vehicle will travel next is calculated on a basis of a road surface information.

17. The control device for a vehicle according to claim 15, wherein the target vehicle speed sequence of the road along which the vehicle will travel next is calculated on a basis of a traffic jam information.

* * * * *